United States Patent [19]
Ackley et al.

[11] 3,743,172
[45] July 3, 1973

[54] QUILTED LAMINAR FILMS COMPRISING AT LEAST TWO LAYERS OF DISSIMILAR MATERIAL

[75] Inventors: Kenneth E. Ackley, Pittsford; Arnold F. Sparks, Holcomb, both of N.Y.

[73] Assignee: Mobil Oil Corporation, New York, N.Y.

[22] Filed: Mar. 23, 1971

[21] Appl. No.: 127,096

[52] U.S. Cl............ 229/55 R, 161/252, 161/413 A
[51] Int. Cl........................................... B65d 33/02
[58] Field of Search.................... 161/252, 118, 413; 229/53, 55

[56] References Cited
UNITED STATES PATENTS

| | | | |
|---|---|---|---|
| 2,956,723 | 10/1960 | Tritsch | 161/252 |
| 3,067,926 | 12/1962 | Brady | 229/55 |
| 2,633,442 | 3/1953 | Caldwell | 161/118 |
| 1,623,107 | 4/1927 | Goodykoontz | 229/41 A |
| 3,399,101 | 8/1968 | Magid | 161/413 X |
| 3,580,797 | 5/1971 | Asmuth | 161/413 |
| 3,393,861 | 7/1968 | Clayton et al. | 229/53 |

Primary Examiner—Davis T. Moorhead
Attorney—Oswald G. Hayes, Andrew L. Gaboriault and James D. Tierney

[57] ABSTRACT

A quilted laminar film structure comprising two layers of dissimilar thermoplastic, for example, one layer of low-density polyethylene and another layer of high-density polyethylene which are heat sealed together along a plurality of intersecting heat seal lines. Such laminar materials are adapted for employment as over wrap packaging materials, thermoplastic bag structures and, in particular, thermoplastic bags characterized by having a specific square bottom configuration.

4 Claims, 10 Drawing Figures

Patented July 3, 1973
3,743,172
3 Sheets-Sheet 1
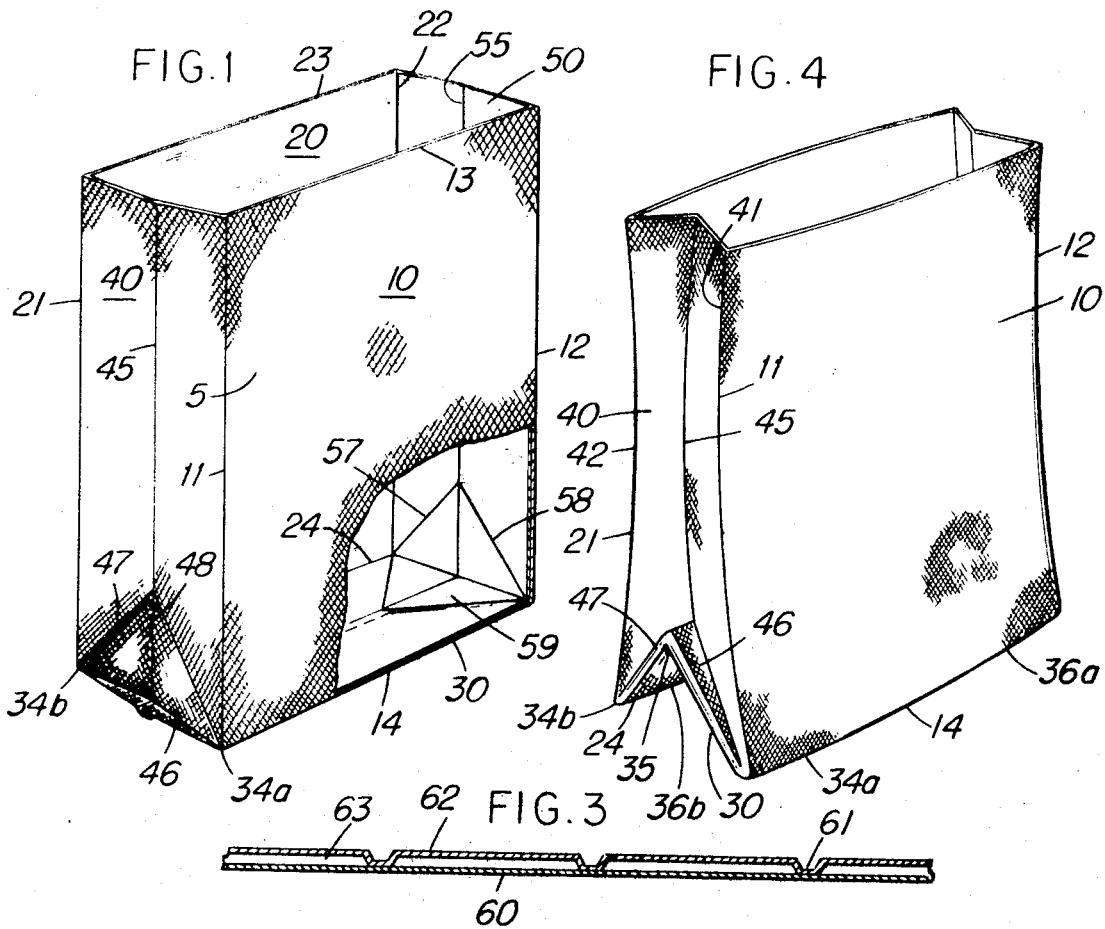
FIG. 1
FIG. 4
FIG. 3
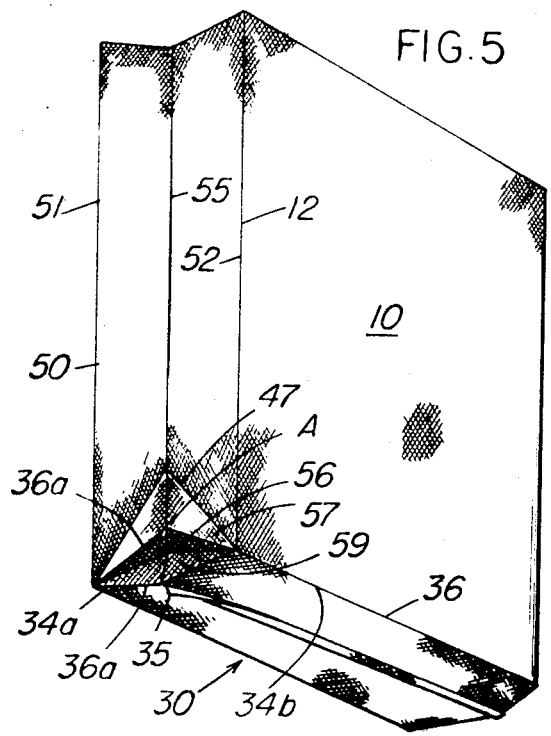
FIG. 5
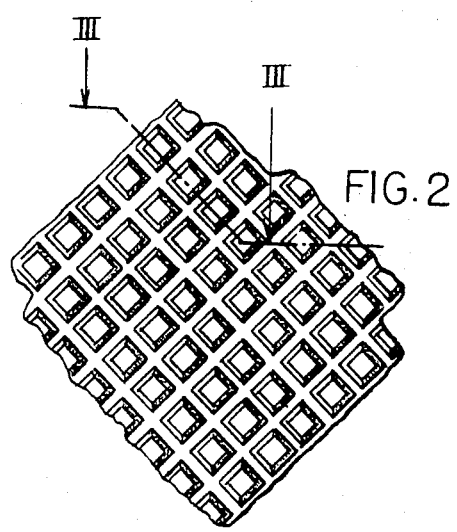
FIG. 2
Inventors
Kenneth E. Ackley
Arnold F. Sparks Patented July 3, 1973

Inventors
Kenneth E. Ackley
Arnold F. Sparks

Patented July 3, 1973

Inventors
Kenneth E. Ackley
Arnold F. Sparks

QUILTED LAMINAR FILMS COMPRISING AT LEAST TWO LAYERS OF DISSIMILAR MATERIAL

CROSS REFERENCE TO RELATED APPLICATIONS

U.S. application, Ser. No. 62,460, filed Aug. 10, 1970, discloses square bottom bag constructions which the laminar film structures of this application may be employed to produce.

BACKGROUND OF THE INVENTION

I. Field of the Invention

The present invention relates to quilted laminar film structures comprising layers of dissimilar thermoplastic films. The laminar films of the present invention have been found useful as packaging materials for end use applications where stiffness and strength are of particular importance, such as, for example overwrap material or in bag constructions which require such characteristics. Such bags may be used as grocery bags or the like, shipped and stored folded flat and easily erected to be free standing for packaging of groceries, canned goods and the like therein.

II. Description of Prior Art

Grocery bags, particularly for use in supermarkets, must stand on their own bottom, with their vertical sides upright for easy filling. Paper bags fulfill these requirements; they do, however, have the disadvantage of generally low strength and, particularly, low "wet strength" that is, rapidly losing any retention capability when becoming wet and, upon even localized wetting, readily disintegrating. Coating paper bags with water-repellent or water-proof materials, such as plastics, is excessively expensive. Paper bags have the additional disadvantage that paper sheets must be secured together, at fold lines with a separately applied adhesive. Some types of adhesives used, as well as the bags themselves, attract vermin which is imported in the homes of the purchasing customer, frequently concealed between folds of the paper bag.

Bags made of plastic material have the outstanding advantage of being waterproof, verminproof, resistant to penetration by grease, oils or the like, and sufficiently flexible to follow contours of articles packed within the bag to prevent tearing, for example by corners of square boxes, cans or the like. In spite of these advantages, however, plastic grocery bags have not found substantial acceptance due to their inability to remain open, and erected, for ease of packing without any additional external support devices.

SUMMARY OF THE INVENTION

Briefly, a quilted laminar film structure which comprises two layers of dissimilar thermoplastic, for example, one layer of low-density polyethylene and another of high-density polyethylene, which layers are heat sealed together along a plurality of intersecting heat seal lines. The employment of dissimilar thermoplastic films, each of said films characterized by having dissimilar physical properties, results in a laminar film product which combines the dissimilar physical properties to suit a particular end use applications such as, for example, quilted laminar bag constructions. Specifically, high density polyethylene film which exhibits a high tensile modulus and high tensile strength will impart stiffness and strength to the bag whereas the low density polyethylene film component will impart a high resistance to tearing of such laminar bag structures.

In another specific embodiment, the laminar films hereinabove described may be employed in the production of plastic grocery bags having side wall and front and back wall portions, as well as a flat bottom, which are so folded for storage and shipping that none of the side or front and back walls have a transverse crease; the side walls having a longitudinal crease, with a pair of angled crease lines extending, when the bag is erected, at 45° from the central crease to the base; the bottom wall, or base has a longitudinal central crease which, during shipping, may be folded outwardly for ease of erection, then preferably, inwardly. Absence of transverse creases permits the bag to stand erected when opened. The material of the side walls of the bag is, preferably, stiffened by quilting, embossing or the like, the quilting or embossing lines having vectorial dimensions extending both vertically, as well as horizontally, to provide for stiffening lines tending to keep the bag both open, as well as the walls erected. Vertical stiffening ribs, in the form of seam lines or projecting tabs formed during manufacture of the bag may also be provided.

A particularly suitable material is a double-ply material, in which the material facing the inside of the bag is smooth, and the outside embossed and quilted by means of quilting lines to the inside material, with air pockets formed between the two layers of materials, the air pockets providing for additional stiffness.

Various quilting or embossing patterns may be used, e.g., diamond, bee-hive (hexagonal), brick-wall type, "brick walk" type, (that is, interlaced rectangles arranged with respect to each other in such a manner that continuous lines extending in any direction are avoided) or other patterns providing for embossing lines, or for quilt lines interconnecting the two walls of the bag material in two vectorial directions. A particularly useful pattern is the diamond pattern.

BRIEF DESCRIPTION OF THE DRAWINGS

FIG. 1 is a perspective view, partly broken away, of a bag in accordance with the present invention just prior to being fully erected;

FIG. 2 illustrates a preferred diamond pattern for the walls of the bag;

FIG. 3 is a cross sectional view along the line III — III of FIG. 2, to an enlarged scale.

FIG. 4 is a fragmentary perspective view of the bag being unfolded;

FIG. 5 is a further fragmentary view of a bag just before being erected;

DESCRIPTION OF SPECIFIC EMBODIMENTS

Figure 6:
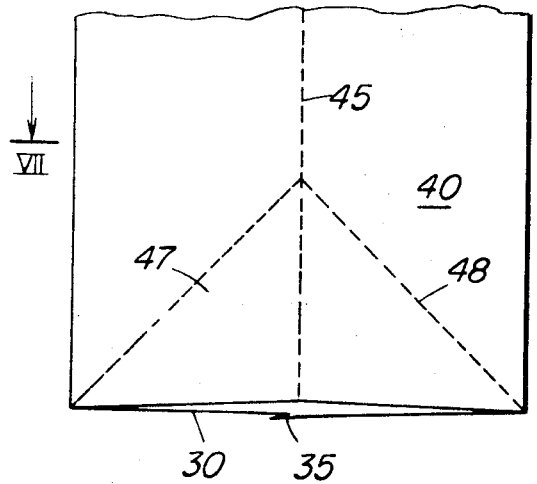
FIG. 6 is a fragmentary side elevation of a bag which has been erected, shown as a single layer for clarity of illustration.

To permit easy loading of bags, for example in grocery stores, supermarkets and the like, the bags must be free standing and self-supporting as generally illustrated in FIG. 1. Paper bags will readily do this; plastic bags, however, due to the generally limp nature of the plastic material, present special problems. It has been found that one of the important features of such a bag is that the side walls do not have any transverse creases, but rather that the bag is so shaped that any crease lines, which may be preformed in the plastic, have at least a substantial vertical component, that is have a vectorial direction which extends vertically when the bag stands on a flat bottom. The plastic material, itself, can be of various types. Polyethylene (PE), and particularly quilted polyethylene is a preferred material. Polyvinyl chloride (PVC) is equally useful. PVC sheet material can readily be pre-creased, and made in such a way that it is substantially stiff. However, in accordance with the present invention, it has been found that a particularly desirable construction for such bags comprises a quilted laminate one layer of which consists of a high density polyethylene material and the other layer, preferably the external layer of the finished bag structure, comprises a layer of low density polyethylene material, said layers being heat sealed together along a plurality of intersecting heat seal lines whereby air is encapsulated between the layers in those areas intermediate the plurality of heat seal lines.

The bag of FIG. 1 has, generally, a front wall 10 of self shape retaining plastic material, with side edges 11, 12, a top edge 13 and a bottom edge 14. The back wall 20 is of similar material, and has side edges 21, 22, a top edge 23 and a bottom edge 24. The bottom is flat, and is formed of a panel 30 of stiff plastic material to join the bottom edges 14, 24 of the front and back panels 10, 20, respectively. The bottom panel need not be unitary, but may, for example, form a continuation of the side panels and be seamed in the middle as seen, for example, in FIG. 1; alternatively, it may comprise a separate panel seamed to the side panels 10, 20, at the bottom edges 14, 24.

The front and back walls 10, 20 are interconnected by a pair of side walls 40, 50, which are preferably gusseted, that is have a longitudinal central crease 45, 55, respectively. The crease lines are pre-formed and so arranged that, upon opening the bag from a flat position, the respective panels will fold along the crease lines to form the erected bag.

The gusseted form of side walls 40, 50, provides additional stiffness and further results in a roomy, easily packed bag. It does, however, cause problems in shipping the bag folded flat, to take up as little space as possible not only for shipment, but also for storage and to be easy to handle. The bags must, in addition to being self-supporting, be so arranged that a store clerk can take one at the free edge and with a minimum of handling open the bag to its fully extended position, preferably with a single shake which may catch air in the opening bag.

The side walls 40, 50 which may be separate elements heat-seamed to the front and back walls, or integral therewith, are joined to the front and back walls at the edges 11, 21 and 12, 22, respectively. The bottom panel 30 will have side edges 34a, 34b which are integrally, or by means of a seam joined to the bottom edges 14, 24 of the front and rear panels, respectively. The edges form a crease line 36a, 36b which is inwardly extending, that is, about which half of the bottom panel 30 can fold, but which is never completely straightened out, forming a 90° angle (see FIG. 1) interconnecting the bottom and side walls, when the bag is erected.

To enable inward folding of the gusseted side walls 40, 50 an inwardly extending crease line 46, 56 interconnects the bottom panel 30 and the respective side wall. If the bottom panel, and the respective side wall are made of a single unitary sheet of material then, in order to provide for proper folding, an additional triangular in-fold will result, as seen at 59; a similar triangular inward fold 49 will be hidden in FIG. 1. Triangularly extending crease lines 47, 48 and 57, 58 interconnect the junction of the bottom panel 30 and the side edges of the front and back walls with the outwardly extending central crease line 45, 55, respectively, of the side walls 40, 50. Upon grasping one of the side or front or back walls of the bag, and shaking it to provide a small opening, air will catch in the air-impervious plastic of the walls and the bag will fold open by itself. The preformation of the crease lines described as well as the absence of transverse crease lines when the bag is erected will permit it to stand freely on the flat bottom formed by bottom panel 30.

The material of the bag of FIG. 1 is best seen in FIGS. 2 and 3. The material is quilted, as seen in cross-section in FIG. 3. For purposes of clarity, the showing of the material as double-ply has been omitted in other drawings.

The material of the bag thus, preferably, has an inner wall element 60 joined at quilting lines, which may be thermoplastic seams 61, to an outer sheet of material 62. The appearance of the bag, therefore, will be embossed. Between layers 60, 62, an air pocket 63 will be formed. Manufacture of such double-ply quilted material is known. It has been found, from experiments, that the stiffness of quilted material, particularly including air pockets is substantially greater than that of materials of equivalent thicknesses which are single-ply or laminates which have been laminated together, throughout their entire interface in the absence of air pockets. FIG. 2 shows a diamond pattern, illustrating embossing (or quilting) lines extending both in horizontal as well as vertical direction, that is having vectorial components both horizontally as well as vertically of the bag. The small diamonds have, in one example, sides which are about 4 – 9 mm long. A good compromise based on stiffness, ease of opening, and shape retention has been found to be the pattern of FIG. 2. Many patterns are, of course, possible; suitable ones include a brick walk or a hexagonal, or bee-hive shaped pattern with the flats of the hexagons arranged either horizontally, or vertically, as desired.

The brick wall and diamond patterns exhibit excellent directional stiffness, i.e., they are relatively stiffer in directions bisecting the angles formed by the embossing, or quilting lines, than along those lines. The brick walk, and hexagonal (bee hive) patterns have an approximately even omnidirectional stiffness, which, however, is less than the maximum directional stiffness of the diamond or brick wall pattern. Other patterns than those shown may, of course, be used.

It is not necessary that the outside surface, that is sheet 62 and the inside surface, that is sheet 60 (FIG. 3) are the same. As illustrated, the inside sheet 60 will be smooth whereas the outside sheet 62 will have an embossed appearance. It is preferred that the inside be smooth, for ease of packing. The sheets may for example, have otherwise different characteristics or appearance, for example, they may be of different thickness.

Figure 8:
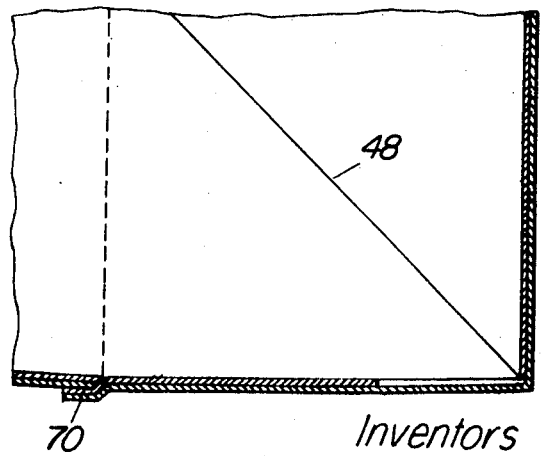
FIG. 8 is a fragmentary sectional view along line VIII — VIII of FIG. 7.
Figure 10:
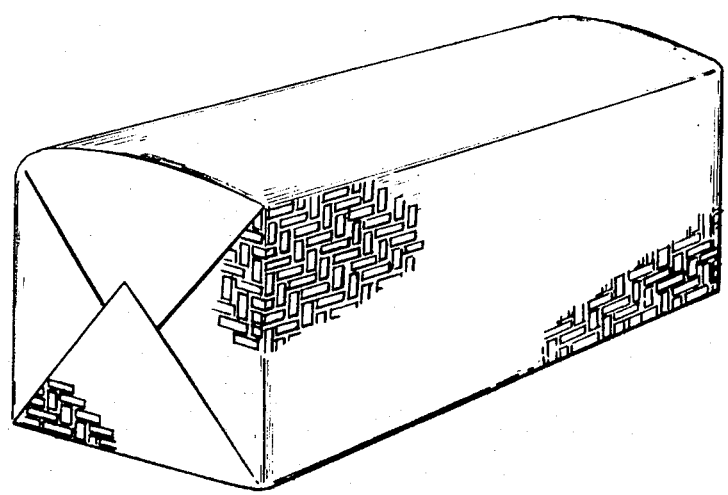
FIG. 10 is a perspective view of a loaf of bread which has been overwrapped utilizing the laminar film construction of the present invention.

FIG. 4 illustrates the double fold-in of the side walls, of which side wall 40 is shown. The bag is made of tubular material having a central seam which will form the seam line 35. The formation of the gusseted side walls 40, 50, having a width equal to the bottom panel 30 can readily be accomplished by providing a preformed crease lines 47, 48 as well as additional edge creases, seen at 46, which, with a pair of additional creases parallel to creases 47, 48 and not visible in FIG. 4, will form an in-turned pocket, seen between the extension of the central crease 45 and the tip of the bottom seam 35, as seen in FIG. 8. The tip of the folded-in triangle, which forms an inwardly extending pocket, can be secured at an inner point A to the central line 35 of the bottom panel 30, or can be left free. The entire bottom triangular fold-in can even be heat-sealed, or otherwise secured to the bottom wall 30, as seen at 59 in FIG. 5; or the lower edges of the gussets of the side wall can be seamed to a seam along central crease line 35 of the bottom panel 30 with or without an additional seam at crease line 46, 56 to the adjacent edge of the bottom panel 30. Point A, lying on the central line 35 of the bottom panel 30 will be inward from the side edges of the bottom wall by a distance equal to half the width of the side wall, or of the bottom panel respectively.

Figure 7:
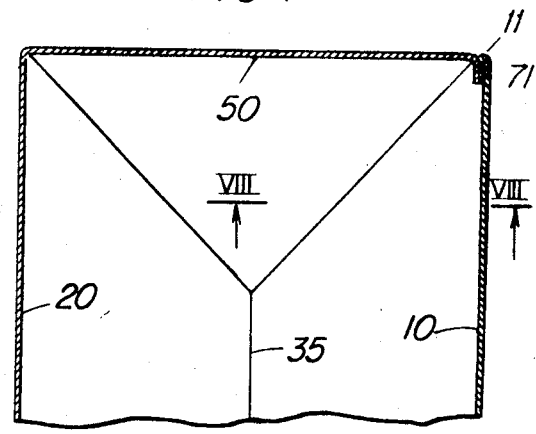
FIG. 7 is a sectional view along line VII — VII of FIG. 6 and illustrating a modification of a bag, partly broken away to show the construction.

The side walls can be stiffened by stiffening folds 70 (FIG. 7, FIG. 8), which can extend lengthwise of the bag, as well as across the bottom panel. If the bag is made of tubular material which is formed from an originally flat sheet, these stiffening folds may, simultaneously, form the junction seam of the flat sheets, as best seen in FIGS. 8 and 7.

When the bag is flattened for shipment, then it is preferably folded to be completely flat, by compressing the bag in the position of FIG. 4. Upon grasping a side wall, for example side wall 10, and shaking the bag, it will catch air and expand through the position of FIG. 4 towards the position of FIG. 5 and FIG. 1. Very little additional manual handling, if any, is needed to completely straighten the bag.

As will be seen the side walls of the erected bag will not have any circumferential, or transverse crease lines which might induce collapse of the bag when erected. The stiffening ribs 70, 71 (FIGS. 7 and 8), if provided, as well as the nature of the material, i.e. a two-ply quilted laminate will contribute to keep the bag in erect, upright position.

Figure 9:
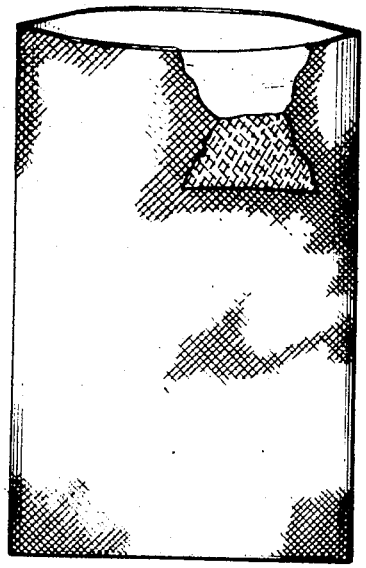
FIG. 9 is a perspective view of another type of bag structure which may be produced utilizing the quilted laminar thermoplastic structures of the present invention.

In a specific embodiment of the laminar structures contemplated within the scope of the present invention quilted laminar film structures, as illustrated for example in FIG. 3, were formed utilizing at least 2 layers of dissimilar thermoplastic films, such as one layer of a low density polyethylene film and another layer comprising a high density polyethylene film, the layers being heat sealed together at predetermined intervals along a plurality of intersecting heat seal lines 62. Applicants have found that by selecting particular thermoplastic films, which have particularly desirable physical characteristics, a laminate may be formed from dissimilar films whereby the resultant product exhibits a combination of desirable properties attributable to the component film layers of the laminate. Specifically, as in the embodiment referred to above, by employing a layer of high density polyethylene and a second layer of low density polyethylene in the laminar structure, when such a laminate is formed into a bag structure, the structure exhibits a high tensile modulus and strength which is attributable to the physical characteristics of the high density polyethylene layer component and, additionally, such bag structures exhibit high resistance to tear which is attributable to the low density polyethylene layer component of the laminate. In addition to bag structures such as for example square bottom bags such as the type illustrated in FIGS. 1 and 4 through 8 inclusive, plain bottom-sealed bags often referred to as a "pillow" type bottom, as illustrated in FIG. 9, may be formed utilizing the quilted laminate of high and low density polyethylene films. Also, applicants have found that such laminates are useful as overwrapping for packaging objects, as well as liner materials which offer cushioning protection or easily frangible articles during shipment or transport. The improved properties such as increased stiffness and puncture resistance that characterize the high density-low density polyethylene laminar materials of the present invention make them ideally suited for such applications.

Low density polyethylene films as contemplated within the scope of the present invention comprise polyethylene films which have been fabricated from polyethylene resins having a density from at least about 0.910 up to about 0.935. High density polyethylene films as contemplated within the scope of the present invention comprise polyethylene films which have been fabricated from polyethylene resins having a density from at least about 0.940 up to about 0.967.

Applicants have found that, when combining high and low density polyethylene layers to form a laminate such as the quilted type of laminate illustrated in FIG. 3, i.e. a laminate structure characterized by having 2 layers of film heat sealed together along a plurality of intersecting heat seal lines, such a structure exhibits superior physical characteristics when compared to laminar structures of high density and low density polyethylene film wherein the 2 layers of film are sealed together continuously throughout their adjacent surface areas. This latter type of lamination may be formed utilizing prior art techniques, such as passing superposed layers of high and low density film through a set of counter-rotating, heated nip rollers.

In the following Table 1, laminar structures as illustrated in FIG. 3, hereinafter referred to as a quilted laminate, formed from layers of high and low density polyethylene are compared to non-quilted laminates i.e. laminates formed by sealing 2 layers together in continuously intimate contact, the layers again constituting a layer of high density and a layer of low density film. The resins employed to produce the component laminar films were commercially available resins of 0.963 density for the high density polyethylene film and 0.918 density for the low density polyethylene film. The thickness of the high density polyethylene film was approximately 1.5 mils and the thickness of the low density polyethylene film was approximately 1.0 mil. The laminar structures of the present invention may be formed utilizing the method and apparatus disclosed in U.S. Pat. No. 3,466,212.

TABLE I

|  | Yield[1] (lb./in.) | | Ultimate[2] (lb./in.) | | Toughness[3] (ft.-lb./in.)² | | Elmendorff tear[4] (gms.) | | Puncture[5] (lbs.) | Elongation[6] (percent) | | Stiffness[7] (grams) | |
| --- | --- | --- | --- | --- | --- | --- | --- | --- | --- | --- | --- | --- | --- |
|  | MD* | TD | MD | TD | MD | TD | MD | TD |  | MD | TD | MD | TD |
| Quilted laminate | 9.1 | 9.4 | 10.4 | 7.5 | 7.1 | 3.9 | 180 | 870 | 24.6 | 950 | 740 | 6.8 | 7.8 |
| Non-quilted laminate | 7.9 | 7.8 | 8.5 | 7.4 | 3.1 | 1.1 | 70 | 530 | 18.5 | 490 | 230 | 1.1 | 2.0 |

[1] A.S.T.M. Test No. D 882.
[2] A.S.T.M. Test No. D 882.
[3] Data collected for determination of tensile strength and elongation, plotted to give a stress-strain curve. Area under curve is toughness value.
[4] A.S.T.M. Test No. 1922.
[5] A 6-inch square sample of material is clamped in place between two annular rings. A 1-inch diameter carriage bowl having an oval head is pressed into the film until the film sample ruptures. The force required to rupture the sample is measured with a torsion gage and is referred to as the puncture of puncture resistance of the sample.
[6] A.S.T.M. Test No. D 882.
[7] A 4-inch square sample of material is placed on two bars set 1 inch apart. A third bar deflects center of sample downwards and stiffness value (grams) is measured as the force required to deflect sample downward 0.1 inch.
*M.D.=Machine Direction; T.D.=Transverse Direction.

It will be seen from the above Table I that the quilted laminar structure exhibits improved physical properties which are particularly desirable for packaging materials and in particular for the construction of grocery bags from such quilted material. In particular, in comparison to the unquilted laminate, the stiffness is increased about 6 fold in the machine direction and the puncture resistance is significantly improved as well as toughness and other physical characteristics of the quilted laminate.

Although the present invention has been described with preferred embodiments, it is to be understood that modifications and variations may be restored to, without departing from the spirit and scope of this invention, as those skilled in the art will readily understand. Such variations and modifications are considered to be within the purview and scope of the appended claims.

What is claimed is:

1. A free-standing bag of plastic material comprising a two-layer quilted material, one of said layers (62) comprising high density polyethylene film with a substantially smooth surface and said other layer (60) comprising low density polyethylene film with an embossed surface, said layer (62) having said substantially smooth surface forming the inside of said bag, and said layer (60) having the embossed surface being heat sealed along a plurality of intersecting head seal lines to said smooth layer and forming the outside of said bag, the areas of said layers between said lines being unconnected and entrapping air to provide air pockets between said lines;

said bag being further characterized by having a front wall having side edges, a top edge and a bottom edge;
a back wall having side edges, a top edge and a bottom edge;
means forming a flat bottom, said means comprising a panel joined to said bottom edges of said front and back walls;
a pair of gussetted side walls, each of said side walls being joined to the side edges of the front and back walls;
the junction of said side edges of said bottom panel and said bottom edges of said front and back walls forming a bottom edge crease line;
said bottom panel being formed with a central crease line parallel to said bottom edge crease lines, said side walls each being formed with a longitudinal central crease line parallel to said side edges and a transverse crease, forming an interconnecting continuation of said bottom edge crease line and continuing said crease line around said bag,
the width of said side wall being the same as the width of said bottom panel;
and a pair of triangular crease lines extending at angles of about 45° from the intersections of said bottom edge crease lines at the junctions of said bottom panel and said front and back walls, respectively, and said side walls, to the longitudinal central crease line of said side walls, and none of the heat seal and crease lines extending uninterruptedly across the width of any one of said panels, whereby said bag will fold open along the crease lines, will be free-standing on the bottom panel when opened, and said side walls will be free of transverse creases and heat seal lines and remain erect to maintain the bag in upright open position.

2. A double walled, thermoplastic bag structure formed of a flattened tube, the walls of said tube being made of a thermoplastic laminate, said laminate comprising
a layer (60) of low-density polyethylene;
a layer (62) of high-density polyethylene,
whereby said layers, individually, will have dissimilar physical properties regarding tensile modulus, tensile strength, and tear resistance;
said two layers (60, 62) being heat bonded together along a plurality of intersecting heat seal lines (61) between which air is entrapped to form air pockets (63),
said heat seal line (61) being arranged with respect to the bag such that they are no seal lines extending uninterruptedly transversely with respect to the bag.

3. A bag structure according to claim 2 wherein the inner layer (60) of the bag is of low-density, high tear strength polyethylene and outer layer (62) is of high density, high tensile modulus and tensile strength polyethylene.

4. A bag structure according to claim 2 wherein the inner layer (60) of the bag is smooth and the outer layer (62) of the bag presents a quilted, embossed appearance.

* * * * *

PO-1050
(5/69)

UNITED STATES PATENT OFFICE
CERTIFICATE OF CORRECTION

Patent No. 3,743,172   Dated July 3, 1973

Inventor(s) KENNETH E. ACKLEY and ARNOLD F. SPARKS

It is certified that error appears in the above-identified patent and that said Letters Patent are hereby corrected as shown below:

Column 5, Line 63,    "62" should be --61--.
Column 7, Line 43,    "head" should be --heat--.

Signed and sealed this 19th day of March 1974.

(SEAL)
Attest:

EDWARD M. FLETCHER, JR.　　　　　　C. MARSHALL DANN
Attesting Officer　　　　　　　　　　Commissioner of Patents